United States Patent [19]

Hooper et al.

[11] Patent Number: 5,188,462
[45] Date of Patent: Feb. 23, 1993

[54] LUBRICANT SYSTEM FOR A ROTARY CONE ROCK BIT

[75] Inventors: Michael E. Hooper, Spring, Tex.; Donald F. Wilcock, Schenectady, N.Y.

[73] Assignee: Smith International Inc., Houston, Tex.

[21] Appl. No.: 487,468

[22] Filed: Mar. 2, 1990

[51] Int. Cl.⁵ .................. F16C 32/06; E21B 10/22
[52] U.S. Cl. ........................... 384/93; 384/123
[58] Field of Search .............. 384/92, 93, 95, 96, 384/121, 123

[56] References Cited

U.S. PATENT DOCUMENTS

| | | | |
|---|---|---|---|
| 4,136,748 | 1/1979 | Dickerhoff | 384/92 X |
| 4,181,185 | 1/1980 | Keller et al. | 384/93 |
| 4,330,158 | 5/1982 | Walters | 384/93 |
| 4,333,691 | 6/1982 | Cooper | 384/93 |
| 4,348,065 | 9/1982 | Yoshioka et al. | 384/121 |
| 4,380,355 | 4/1983 | Beardmore | 384/123 |
| 4,410,284 | 10/1983 | Herrick | 384/93 |
| 4,657,091 | 4/1987 | Higdon | 384/93 X |
| 4,771,744 | 9/1988 | Corbett | 384/123 X |
| 4,875,532 | 10/1989 | Langford, Jr. | 384/95 X |

FOREIGN PATENT DOCUMENTS

| | | | |
|---|---|---|---|
| 255712 | 10/1989 | Japan | 384/121 |
| 1095999 | 12/1967 | United Kingdom | 384/121 |

Primary Examiner—Thomas R. Hannon
Attorney, Agent, or Firm—Robert G. Upton

[57] ABSTRACT

A radially disposed thrust bearing surface formed in a rotary cone is provided with at least a pair of grooves and a ramp surface on the trailing edge of the grooves. The groove provides a lubricant reservoir and the ramp serves to generate hydrodynamic pressures during rotation of the rotary cone on the thrust surface of a journal bearing thereby distributing a film of lubricant on the opposing thrust bearing surfaces.

3 Claims, 5 Drawing Sheets

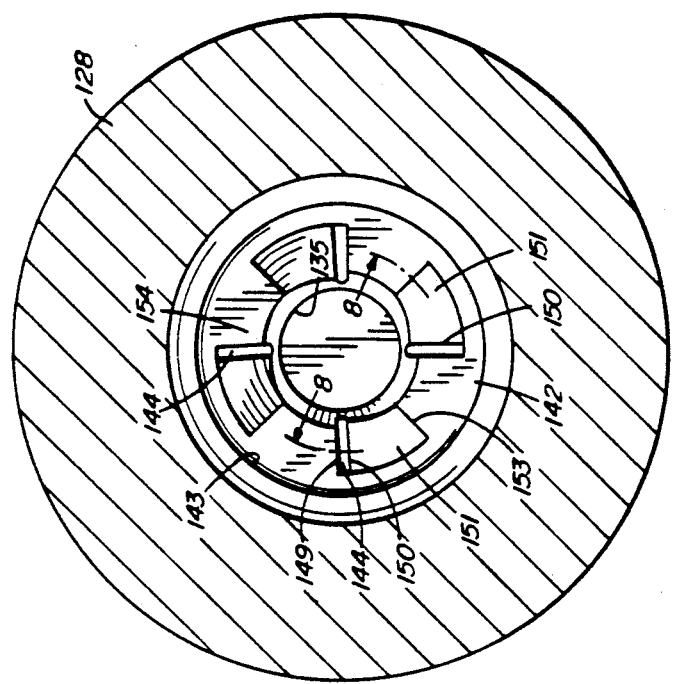
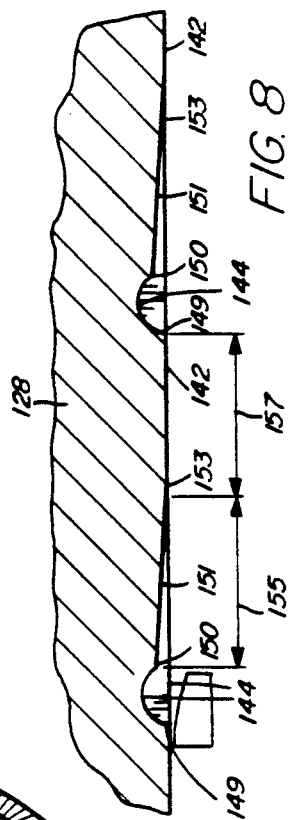
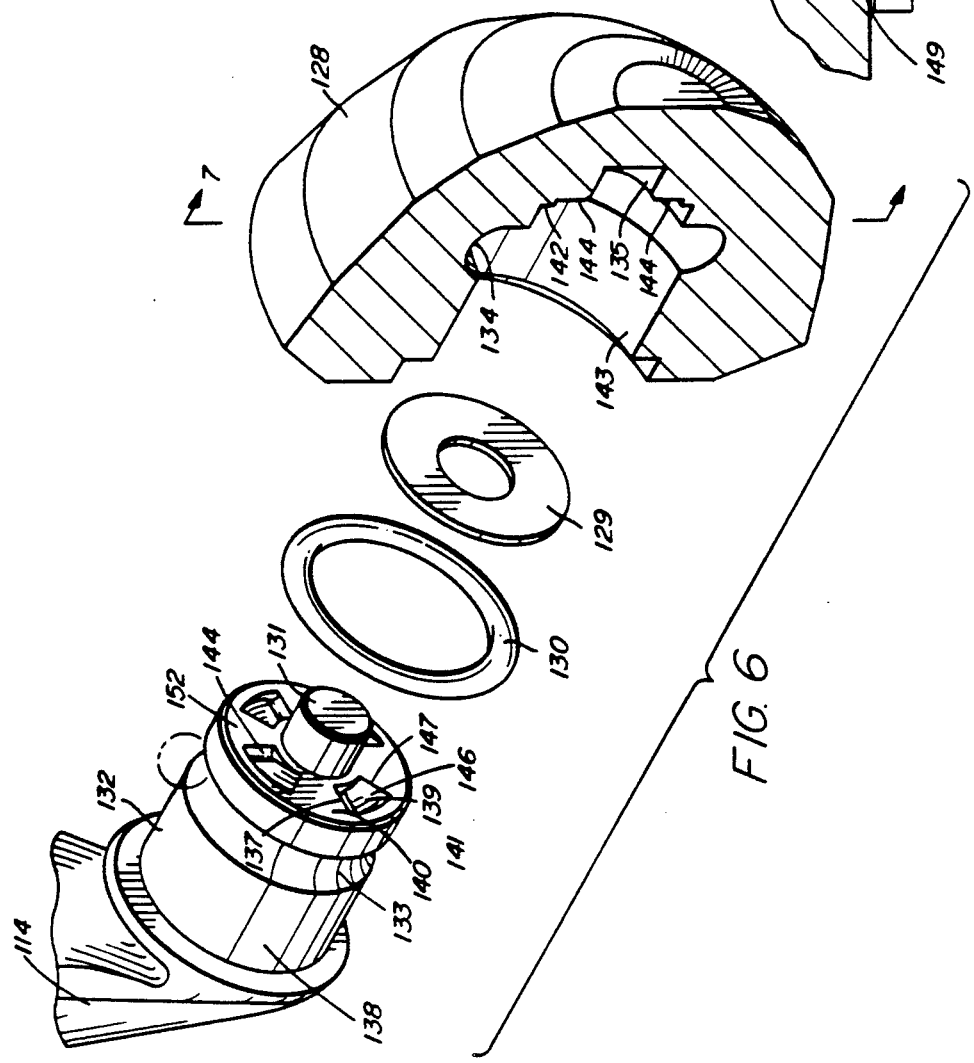

LUBRICANT SYSTEM FOR A ROTARY CONE ROCK BIT

BACKGROUND OF THE INVENTION

I. FIELD OF THE INVENTION

This invention relates to sealed bearing rotary cone rock bits and a means to lubricate opposing thrust bearing surfaces.

More particularly this invention relates to an improved method to distribute lubricant in the thrust surfaces formed in a rotary cone and the end of a main bearing of a rotary cone rock bit.

II. DESCRIPTION OF THE PRIOR ART

It is known to provide chordally disposed lube slots in an axial thrust surface formed on the end of a main radial journal bearing for a rotary cone rock bit. The chordally disposed slots are formed in the axial thrust surface of the leg. These generally chordally disposed slots leave sharp edges. These edges tend to remove lubricant from the opposing thrust surfaces rather than distribute lubricant on these surfaces. The corners of the slots are deburred by secondary manufacturing operations but still leave sharp edges.

U.S. Pat. No. 4,410,284 assigned to the same assignee as the present invention teaches a rolling cutter drill bit with at least one downwardly extending leg which supports a cantilevered bearing shaft. A cutter cone is rotatably mounted on the bearing shaft. A radially disposed thrust washer is positioned between the journal and the cone, the washer further includes a lubricant transferring means in each radially disposed side of the washer to assure adequate lubrication of the roller cone mounted on the journal bearing. The thrust washer forms at least a pair of passages to transfer lubricant through the washer from one bearing surface to an opposite bearing surface. Grooves on opposite sides of the thrust washer distribute lubricant to the bearing surfaces. The grooves however have relatively sharp edges and tend to wipe an opposing bearing surface clean rather than distribute lubricant thereon.

The present invention provides a means to apply a film of lubricant on bearing surfaces by providing a ramp emanating from grooves in the bearing surface or shallow groove with rounded edges to create hydrodynamic pressures to facilitate distribution of the film of lubricant on the bearing surfaces.

SUMMARY OF THE INVENTION

It is an object of this invention to provide radially disposed lubricant grooves in the thrust surfaces of a rotary cone rock bit with a means to create a hydrodynamic pressure to facilitate distribution of the lubricant on the bearing surfaces.

It is another object of the present invention to provide a ramp adjacent to the radially disposed grooves to generate hydrodynamic pressure thereby distributing lubricant onto the bearing surfaces.

It is yet another object of the present invention to provide shallow groove with rounded edges to distribute lubricant onto the bearing surfaces.

It is still another object of the present invention to provide a means to create the grooves and ramps adjacent the radially disposed grooves by stamping or "coining" the grooves and ramps in the material.

A thrust bearing lubrication means is disclosed for a rotary cone rock bit consisting of a rock bit body, the body forming a first pin end and a second cutting end. The body further forms at least one leg having a main journal bearing cantilevered from a cutting end of the leg. The journal forms a cylindrical radial bearing surface and an axial thrust bearing surface. A rotary cone is adapted to rotate on the main bearing. The cone forms a radial bearing surface and an axial thrust bearing surface thereby. At least one substantially radially disposed groove is formed on one of the axial thrust bearing surfaces formed by the cantilevered journal bearing and the rotary cone. The groove communicates with a lubrication orifice formed in the leg of the bit. The orifice serves as a conduit for a source of lubricant contained in a lubricant reservoir formed in the leg. A ramp is formed in one of the axial bearing surfaces. The ramp extends from a trailing edge of the groove gradually converging with a planar bearing surface of the axial bearing. The ramp serves to develop hydrodynamic pressure forces between thrust bearing surfaces when the cone is rotated on the main bearing thereby distributing a film of lubricant between axial thrust bearing surfaces.

Alternatively, a shallow groove is stamped into at least one of the axial bearing surfaces, the edges of the groove have inherent large external radii to develop hydrodynamic pressure forces thereby distributing a film of lubricant between axial thrust bearing surfaces.

An advantage then of the present invention over the prior art is the means in which a film of lubricant is distributed along axial thrust bearing surfaces.

More particularly an advantage of the present invention over the prior art is the means in which a ramp is provided on the trailing edge of a radially disposed groove to generate hydrodynamic pressures to distribute a film of lubricant along thrust bearing surfaces.

The above noted objects and advantages of the present invention will be more fully understood upon a study of the following description in conjunction with the detailed drawings.

BRIEF DESCRIPTION OF THE DRAWINGS

FIG. 6 is an exploded perspective view of an alternative embodiment of the present invention;

FIG. 7 is a view taken through 7—7 of FIG. 6,

FIG. 8 is a view through 8—8 of FIG. 7;

DESCRIPTION OF THE PREFERRED EMBODIMENTS AND BEST MODE FOR CARRYING OUT THE INVENTION

Figure 1:
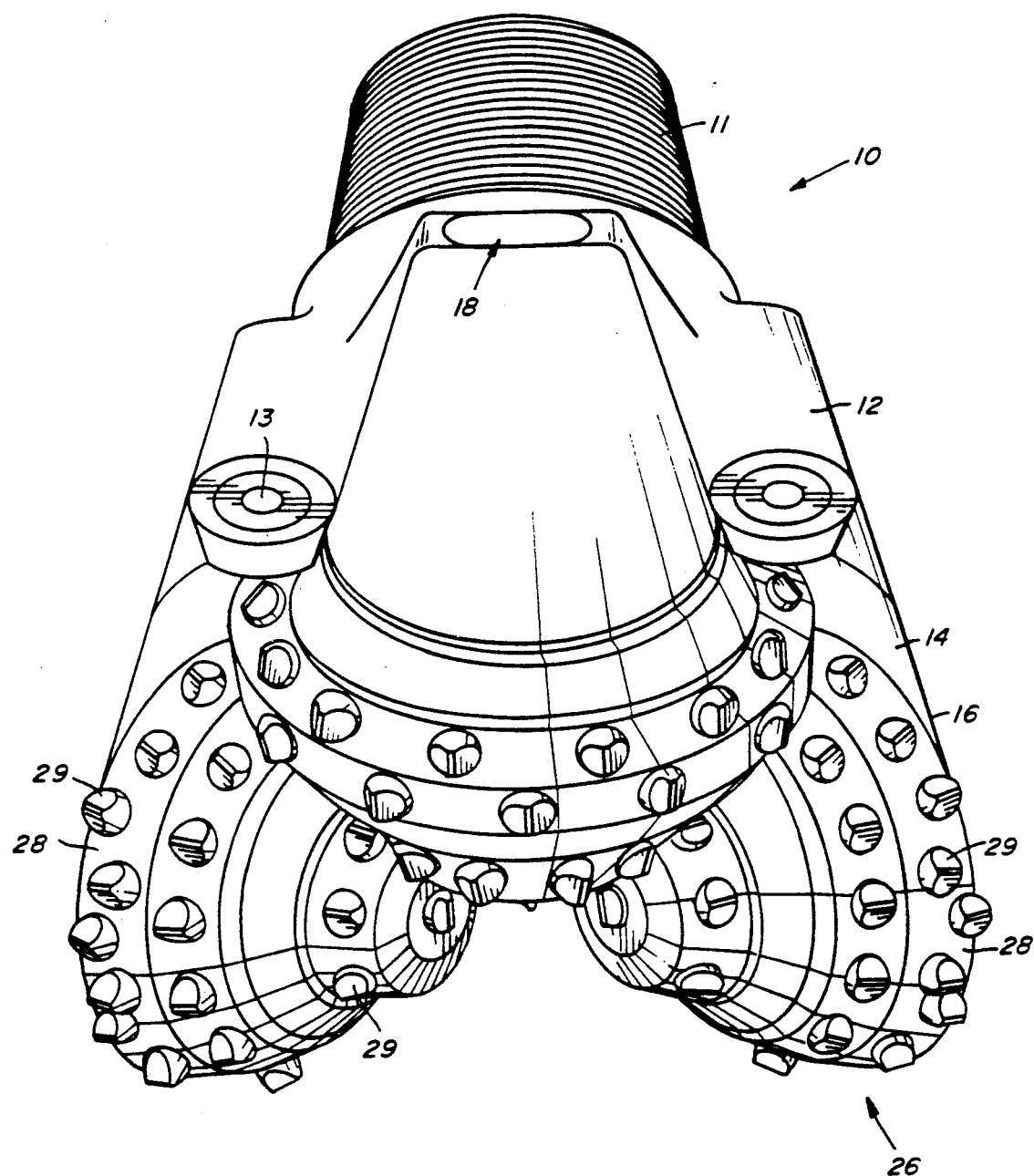
FIG. 1 is a perspective view of a typical sealed bearing rotary cone rock bit.

With reference now to FIG. 1 the sealed bearing rotary cone rock bit generally designated as 10 consists of rock bit body 12 pin end 11 and cutting end generally designated as 26. Each cone 28 associated with cutting end 26 is rotatably attached to a journal bearing extending from a leg 14 that terminates in a shirt tail portion 16. Each of the cones 28 has for example a multiplicity of substantially equally spaced tungsten carbide cutter inserts 29 interference fitted within insert holes formed in the cone body 28. A lubricant reservoir generally designated as 18 is provided in each of the legs 14 to supply lubricant to bearing surfaces formed between the rotary cones and their respective journals. Three or more nozzles 13 communicate with a chamber formed inside the bit body 12 (not shown). The chamber receives drilling fluid or "mud" through a pin end 11, the fluid then is directed out through the nozzles 13 during bit operation.

Figure 2:
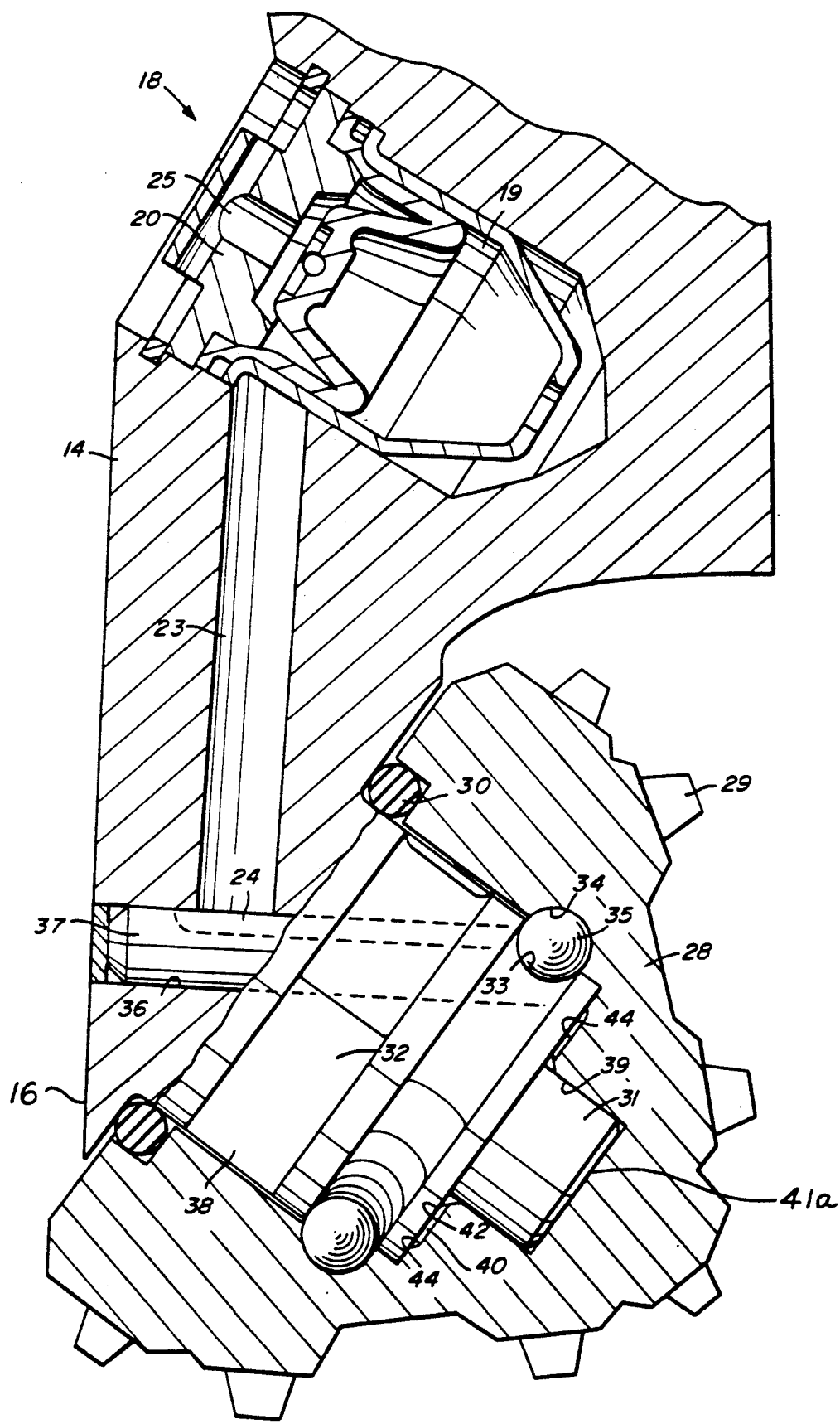
FIG. 2 is a partially broken away section of one leg of the rock bit of FIG. 1 illustrating the cone rotatably secured to a cantilevered journal bearing extending from the leg.

Turning now to FIG. 2, the sectional rock bit leg 14 illustrates the lubricant reservoir system generally designated as 18. The reservoir system comprises a reservoir cover cap 20 that closes out a lubricant reservoir cavity 19. Reservoir 19 is isolated from the cover cap by a resilient diaphragm 22; the diaphragm being responsive to exterior pressures through a hole 25 formed in the cover cap 20. The lubricant is passed down lubricant channel 23 formed in leg 14 toward ball hole 36 formed through the shirt tail portion 16. Lubricant then enters into a lube channel 24 formed in a ball hole plug 37. The lubricant exits through the ball race 33 formed in radial journal bearing 32 and ball race 34 formed in the cone body 28. The ball hole plug 37 is slotted along surface 24 to allow lubricant passing through conduit 23 to move along the ball plug hole 36 and through the ball races 33 and 34 formed between the cone 28 and the journal 32. The lubricant moves through the ball races 33 and 34 towards axial thrust bearing surface or "snoochy" 40 formed in the end of the radial bearing 32. The opposing thrust bearing surface 42 formed in the rotary cone 28 is directed against the "snoochy" 40 through an out thrust generated when the rock bit 10 is rotated in a borehole. The out thrust generates a great deal of force against these axial thrust bearing surfaces 40 and 42. The radial bearing surface 39 formed in cone 28 supports pin 31 projecting from the axial thrust bearing 40 of the radial bearing 32. A secondary axial thrust bearing resides at the end of the pin (41a).

Figure 3:
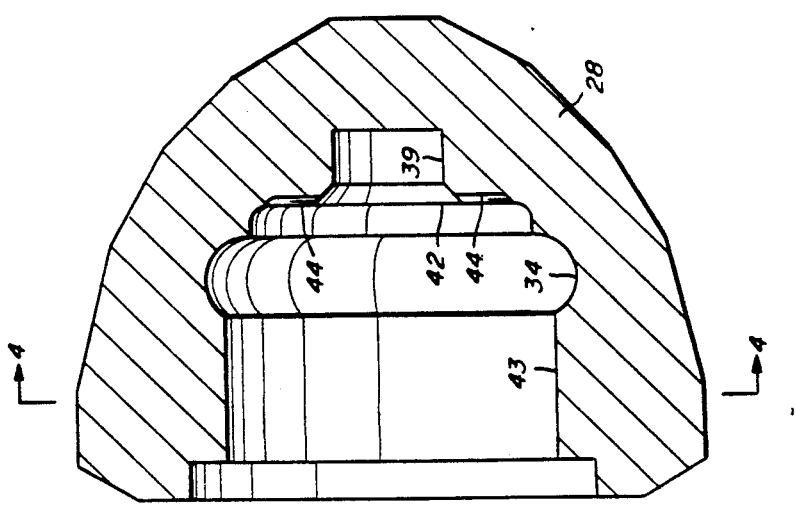
FIG. 3 is a cross-section of the rotary cone.

With reference now to FIG. 3 the cone 28 is illustrated without the inserts 29 for clarity. The axial thrust bearing surface 42 is shown with a groove 44 formed in the surface 42.

Figure 4:
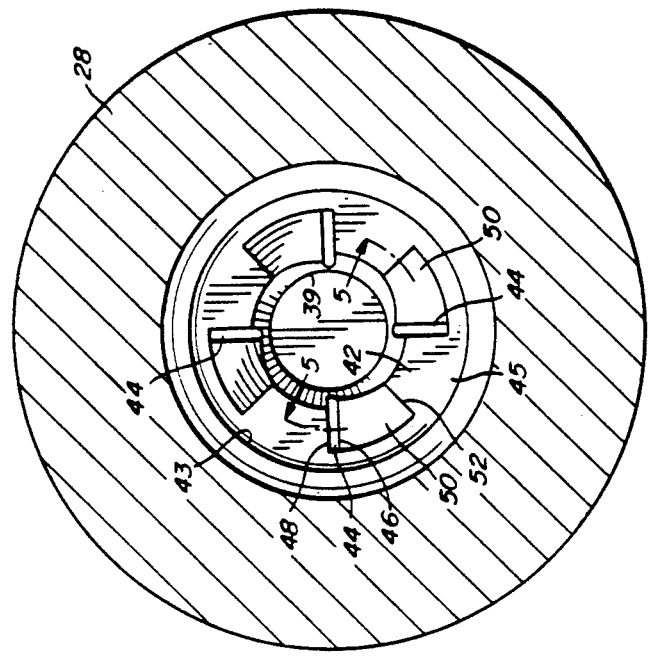
FIG. 4 is a view taken through 4—4 of FIG. 3 illustrating a plan view of the thrust bearing surface formed in the cone.

FIG. 4 clearly depicts the groove 44 formed in surface 42 of the cone 28. Surface 42 defines a leading edge 48 and a trailing edge 46 of the shallow groove 44. The trailing edge 46 is below the planar surface 45 of the thrust bearing surface 42. The trailing edge 46 transitions into a ramped surface 50. The surface 50 tangents (becomes coincident) with planar surface 45 at point 52. It is obvious that this geometry may apply to the secondary thrust surface 41a. The distance between the intersection edge 52 and the leading edge 48 of the next groove 44 is about half way between the grooves 44 in the example shown in FIGS. 3 and 4 where there are equidistantly spaced grooves 90° apart around the circumference of the axial thrust bearing surface 42.

Figure 5:
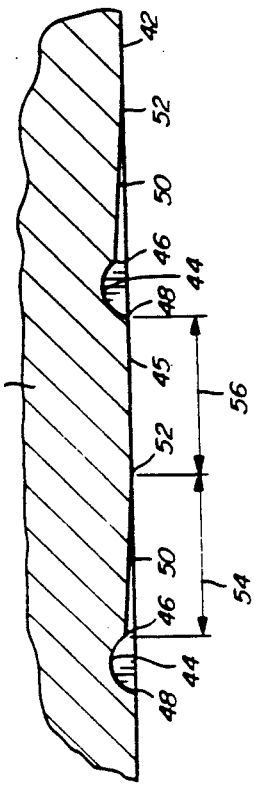
FIG. 5 is a view taken through 5—5 of FIG. 4 illustrating the groove and its associated ramp formed in the axial thrust bearing surface of the cone.

FIG. 5 illustrates a section through the grooves 44, the ramp 50 and the planar surface 45 of the axial thrust bearing surface 42.

For example, a 7⅞" diameter rotary cone would have a main journal bearing of approximately 2" with a pin 31 having a diameter of approximately 1". The depth of the groove 44 is approximately 0.002" deep, the leading edge of 46 being below the planar surface 45 approximately 0.0005". The ramp angles would be approximately 0.2° to 3°, the ramp intersecting the planar surface 45 at point 52. The intersecting point 52 is approximately midway between the leading edge of the adjacent groove 44 in axial thrust surface 42.

It would be obvious to have more or less grooves and ramps formed in surface 42 of the cones 28.

It would be obvious to form the grooves in a spiral or chordal orientation.

The depth of the grooves 44 are relatively shallow with non-sharp leading edges 48. The grooves 44 are preferably stamped into surface 42 of the cones 28 by a die. The die plastically deforms the metal material of the cones 28. Typically the cones are fabricated from steel. The dies are so configured to form the grooves 44 and the ramps 50 in surface 42 of the cones 28.

It would be obvious to form the grooves 44 and the ramps 50 through other metal forming processes such as a milling machine without departing from the scope of this invention.

An alternative embodiment is illustrated with respect to FIGS. 6–8.

FIG. 6 is an exploded view of an alternative embodiment illustrating a rock bit leg 114 having a journal bearing 132 projecting from leg 114. The journal defines a radial bearing surface 138 and a ball race 133. The journal further defines a radially disposed axial thrust bearing surface 140 formed in the end of the journal 132. Pin 131 extends from the thrust bearing surface 140. An o-ring 130 provides a seal for the bearing surfaces defined between the journal bearing 132 and the cone 128. A thrust washer 129 floats between thrust bearing surface 140 and on the journal 132 and the thrust bearing surface 142 defined within cone 128.

The primary thrust bearing surface 140 defines a series of equidistantly spaced grooves 141 each groove 141 having a leading edge 137, a trailing edge 139, a ramp 146 and a tangent 147. The intersecting edge 147 is about half way between the grooves 141. Similar grooves and ramps are formed in the cone 128. Groove 144 is formed in the axial thrust bearing surface 142.

With reference now to FIG. 7, the grooves 144 formed in axial thrust bearing surface 142 define a leading edge 149 and a trailing edge 150, the trailing edge 150 is below the planar surface 154 formed in axial thrust surface 142. Ramp 151 is initiated adjacent the trailing edge 150, the ramp exiting tangent 153 in planar surface 154. Again the intersecting edge 153 is about half way between the grooves 144 in the example shown. The grooves are approximately 90° apart around the circumference of the axial surface 142. It is obvious that the intersecting edge may be at any location between adjacent grooves.

FIG. 8 illustrates the groove 144 preferably stamped into the bearing material of the cone 128 by a stamp and die process. The grooves are typically about 0.002" deep and the trailing edge 149 is angled such that it does not provide a sharp edge to wipe lubricant from the axial thrust surfaces as previously described. The leading edge 150 is about 0.0005" below the planar surface 154, the ramp angle being between 0.2° and 3° exiting the groove at intersecting edge 153. Again the groove and ramp takes up about half the distance between grooves. The distance between leading edge 150 and tangent 153 is about the same as from tangent point 153 to the trailing edge of the adjacent edge of the groove 149.

The floating washer 129 of course forms flat planar surfaces 159 and 160 on either side of the washer. The grooves and ramps in surface 140 of journal bearing 142 and the grooves and ramps in surface 142 of the cone 128 both ride on the flat surfaces 159-160 the floating thrust washer 129. Lubricant will be evenly distributed between each of the coined surfaces and the thrust washer thus providing a superior means to provide a film of lubricant to these axial thrust bearing surfaces 140 and 142.

Figure 9:
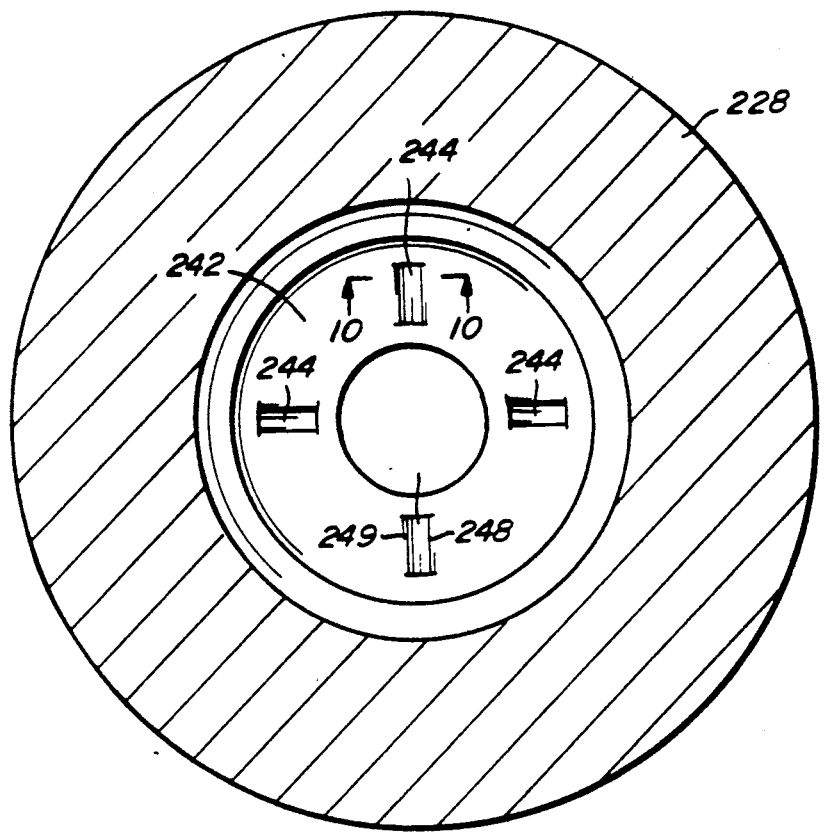
FIG. 9 is a plan view of an alternative groove.
Figure 10:
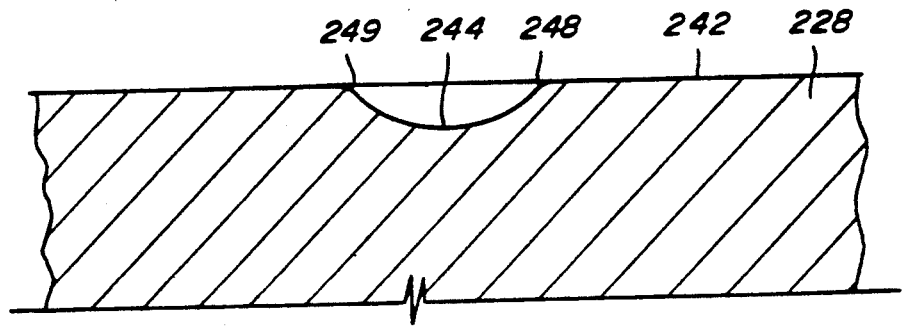
FIG. 10 is a view taken through 10—10 of FIG. 9.

It is obvious that the grooves and ramps be placed in the washer in place of the leg and cone. Turning now to yet another alternative embodiment of FIG. 9, the cone 228 has shallow grooves 244 formed in surface 242. The grooves are, for example, stamped by a die (not shown) to form a shallow depression with rounded leading and trailing edges. The angle formed between the groove walls and surface 242 is radiused by rounded corners 248 and 249. The groove is shallow with a large radius forming low ramp angles to encourage hydrodynamic transportation of the lubricant contained within groove 244.

It will of course be realized that various modifications can be made in the design and operation of the present invention without departing from the spirit thereof. Thus while the principal preferred construction and mode of operation of the invention have been explained in what is now considered to represent its best embodiments which have been illustrated and described. It should be understood that within the scope of the appended claims the invention may be practiced otherwise than as specifically illustrated and described.

What is claimed is:

1. A thrust bearing lubrication means for a rotary cone rock bit comprising:
    a rock bit body, said body forming a first pin end and a second cutting end, said body further forming at least one leg having a main journal being cantilevered from a cutting end of the leg, said bearing forming at least a cylindrical radial bearing surface and an axial thrust bearing surface,
    a rotary cone adapted to rotate on said bearing, said cone forming at least a radial bearing surface and an axial thrust bearing surface,
    at least one substantially radially disposed groove is formed in one of said axial thrust bearing surfaces formed by said cantilevered journal bearing and said rotary cone, said groove communicates with a lubrication orifice formed in said leg, said orifice serves as a conduit for a source of lubricant contained in a lubricant reservoir formed in said leg, and
    a ramp formed in one of said axial bearing surfaces, said ramp extends from a trailing edge said groove gradually converging with a planar bearing surface of said axial bearing, said ramp is formed by stamping said ramp with a die thereby forming said ramp through plastic deformation, said die forming rounded edges that define said ramp, said ramp serves to develop hydrodynamic pressure between thrust bearing surfaces hen said cone is rotated on said main bearing thereby distributing a film of lubricant between axial thrust bearing surfaces.

2. The invention as set forth in claim 1 wherein said thrust bearing lubrication means further comprises a floating axial thrust bearing washer, said washer being positioned between said main journal bearing axial thrust surface and said axial thrust bearing surface formed by said rotary cone, at least one substantially radially disposed groove is formed in said main journal bearing axial thrust bearing surface and said thrust surface formed by said cone, said grooves having die stamped ramped surfaces formed on a trailing edge of each of said grooves, said die forming rounded edges that define said ramp, said ramps gradually converging with planar axial thrust bearing surfaces formed by said main bearing and said axial thrust bearing surface formed by said cone, said thrust washer and said main and cone axial bearing surfaces communicating with said source of lubricant whereby said lubricant is hydrodynamically distributed on all of the thrust bearing surfaces formed by the thrust washer, the main bearing and the cone when said cone is rotated on said main bearing.

3. A method to form a means to distribute a source of lubricant from a lubricant reservoir to an axial thrust bearing surface formed on a main journal bearing of a sealed bearing rotary cone rock bit and an axial thrust bearing surface formed on a rotary cone comprising the steps of:
    forming at least one substantially radially disposed groove in one of said axial thrust bearing surfaces formed by said main journal bearing and said cone,
    forming a ramp in said thrust bearing surface at a trailing edge of said groove by stamping said axial bearing surface with a die, thereby plastically deforming said bearing surface to form said ramp, said die forming rounded edges that define said ramp, said ramp gradually converging with a planar surface of said thrust bearing surface, and
    directing said source of lubricant from said reservoir unto said ramp, said ramp serves to develop hydrodynamic pressure as said lubricant passes along the ramp thereby spreading a film of lubricant from said lubricant reservoir along said axial thrust bearing surfaces when said cone is rotated on said main bearing.

* * * * *